United States Patent [19]

Tesmer

[11] Patent Number: 4,594,031
[45] Date of Patent: Jun. 10, 1986

[54] CHIP EXTRACTOR BUSHING
[75] Inventor: Earl B. Tesmer, Kent, Wash.
[73] Assignee: The Boeing Company, Seattle, Wash.
[21] Appl. No.: 658,074
[22] Filed: Oct. 5, 1984
[51] Int. Cl.[4] ............................................. B23B 49/02
[52] U.S. Cl. ................................ 408/72 B; 408/115 B; 408/241 B
[58] Field of Search ............... 408/72 B, 115 B, 241 B

[56] References Cited

U.S. PATENT DOCUMENTS

| | | | |
|---|---|---|---|
| 479,039 | 7/1892 | Van Benthuysen . | |
| 1,612,205 | 12/1926 | Muth | 408/241 R |
| 1,617,554 | 2/1927 | Swartz | 408/241 R |
| 2,058,298 | 10/1936 | Chesley | 408/72 R |
| 2,737,425 | 3/1956 | Fisher | 408/241 B |
| 2,744,424 | 5/1956 | Fisher | 408/241 B |
| 3,180,379 | 4/1965 | Stewart | 408/211 |
| 3,204,284 | 9/1965 | Merriman | 16/2 |
| 3,349,649 | 10/1967 | Mele | 408/241 R |
| 3,756,736 | 9/1973 | Marcoux | 408/14 |
| 3,768,918 | 10/1973 | Bethke | 408/72 |
| 3,981,604 | 9/1976 | Cenis | 408/72 |

FOREIGN PATENT DOCUMENTS 986641  1/1983  U.S.S.R. ............... 408/241 B

*Primary Examiner*—William R. Briggs
*Attorney, Agent, or Firm*—Christensen, O'Connor, Johnson & Kindness

[57] ABSTRACT

Disclosed is a bushing (12) for guiding a rotating member such as a drill (10) into a workpiece (16). Scored in the interior wall of the bushing bore is a groove (18) in the form of a counterclockwise helix having size and slope characteristics that provide effective removal of the shavings or "chips" from the interior portion of the bushing bore as the drill cuts into the workpiece.

6 Claims, 3 Drawing Figures

CHIP EXTRACTOR BUSHING

TECHNICAL AREA

This invention relates to bushings for guiding rotating members such as drills into a workpiece, and more particularly to the extraction of chips from such bushings.

BACKGROUND OF THE INVENTION

Guide bushings play an important role in precision drilling and reaming operations. Typically, guide bushings are annularly shaped elongate elements formed of steel. They are usually fitted into a drill plate that is designed to be securely held adjacent to the workpiece that is to be drilled or reamed. The bore of the bushing acts to ensure straight entry and exit of the rotating member, typically a twist drill or reamer. (While the rotating member is hereinafter referred to as a twist drill or drill, it is to be understood that a bushing made in accordance with this invention could also be utilized with a reamer.)

Shavings of the workpiece are formed by the shearing action of a rotating drill as it advances through a workpiece. These shavings are most commonly referred to as chips. The chips are sometimes continuous, but often in the form of several pieces, depending upon the material being drilled or the design of the drill. During a drilling operation using a guide bushing, problems are encountered when chips rising through the flutes of the drill become compacted in the guide bushing. Compaction of chips in the guide bushing leads to compaction of chips in the workpiece which results in an undesirably rough surface finish of the hole being drilled. The compacting of chips in the bushing has a binding effect on the drill. The binding effect of the chips increases the amount of torque that must be applied to the drill and can lead to drill stalling, excessive drill and bushing wear, or drill breakage. Wearing of the guide bushing results in difficulties positioning the drill in order to form the precise hole required.

Methods currently used in attempts to solve the chip compaction problem generally include backing the drill out of the guide bushing to allow the chips to fall away from the drill and the bore of the bushing, or modifying the drill by altering the dimensions of the drill lands and flutes. Another alternative is to configure the drill plate that holds the bushing so that the bushing is spaced away from the workpiece. The space between the bushing and the workpiece allows most chips to separate and fall off the drill before entering the bushing. The disadvantage of such a drill plate configuration is that a space between the workpiece and the bushing is detrimental to precision drilling. Precise drilling operations require that the bushing be placed in direct contact with the surface of the workpiece for best control of the drill as it enters the workpiece.

In addition to the foregoing attempts to solve the chip compaction problem in guide bushings, attempts have been made to design bushings that avoid the problem. U.S. Pat. No. 1,612,215 issued to Muth describes a bushing that is intended to avoid compaction problems by breaking up chips so that they may either be directed upward or fall down out of the way of the bushing. Again, in order to fall out of the way of the bushing, there must be a space between the bushing and the workpiece, resulting in the previously discussed diminished drilling precision. Muth uses a bushing having a groove extending nearly vertically from one end of the bushing to the other. As the drill is rotated within the bushing, a scissor-like action is created between the leading edges of the drill lands and the bushing groove. This action causes the chips to be chopped or broken up into smaller pieces. The major problem with the Muth bushing is that the chips that are chopped or broken by the groove tend to compact and bind in the flutes of the drill located within the wall of the bushing. This binding impedes the upward movement of the chips through the bushing causing further compacting and binding. Chips are especially prone to bind in the Muth bushing if the bushing is held—as it should for precise drilling—in contact with the workpiece. In this case, all of the broken chips must be forced through the bushing since they are unable to fall away before entering the bushing. Thus, Muth does not completely solve the chip compaction problem of earilier bushings. Furthermore, the above-described scissor-like action between the groove and the drill will cause rapid wearing of the drill.

For precision drilling it is also to use as long a bushing as possible since a longer bushing provides greater control of a drill positioned within the bushing's bore. The previously mentioned compaction problem limits the length of bushing that can be utilized since the longer the bushing the greater the chance that compaction will occur as the chips travel up the length of the bushing. Most bushings commonly used today utilize a bore length that is approximately two to three times the internal diameter of the bore. This length is selected so that the bushing can adequately guide the drill in a straight line, without being so long as to aggravate the chip compaction problem.

This invention provides a bushing that effectively removes the chips from the workpiece while avoiding the compaction problems just described. Due to the effectiveness of the chip removal capability of a bushing made in accordance with this invention, the bushing may be placed in direct contact with the workpiece and be significantly longer than currently used bushings. Additionally, the bushing of this invention obviates the need for the time consuming process of backing the drill out of the bushing during the drilling operation.

SUMMARY OF THE INVENTION

In accordance with this invention, a bushing is provided for guiding a rotating member into a workpiece. The bushing includes a housing having a substantially cylindrical, longitudinal bore. The bushing has a first end that defines a plane substantially perpendicular to the longitudinal axis of the bore. The first end is designed to be placed adjacent to the workpiece during operation of the rotating member. A groove is scored in the wall of the bore and extends through the bore from the first end to the second end of the bushing in a counterclockwise helix. The slope of the groove with respect to the circumference of the bore is less than 50%.

In accordance with other aspects of this invention, the width of the groove is between 25%–50% of the product of the slope and the circumference of the bore.

In accordance with still other aspects of this invention, the cross-sectional shape of the groove is defined by a first surface and a second surface, the plane of the first surface at any given point along the circumference of the bore being substantially perpendicular to a plane that is tangent to the circumference at that given point, the plane of the second surface at any given point along the circumference of the bore obliquely intersecting a plane that is tangent to the circumference of the bore at that given point, at any given point along the groove the first surface is oriented between the second surface and the first end of the bushing.

In accordance with further aspects of this invention, the interior wall of the bushing is chamfered at the first end of the bushing to eliminate any sharp edges that are formed by the groove near that end.

This invention further provides a bushing where the internal groove is sloped to avoid any scissor-like action between the rotating drill and the groove, while guiding the chips through the bushing away from the workpiece without the undesirable chopping or breaking of the chips. The bushings made in accordance with this invention will work in conjunction with any standard drill, thus obviating the need for modification of the drill. Furthermore, since the chips are moved up and through the bushing instead of dropping out of it, there is no need to space the bushing a distance away from the workpiece.

BRIEF DESCRIPTION OF THE DRAWINGS

The foregoing and other advantages of this invention will become more readily appreciated as the same becomes better understood from the following detailed description when considered in combination with the accompanying drawings, wherein.

DESCRIPTION OF THE PREFERRED EMBODIMENT

Figure 1:
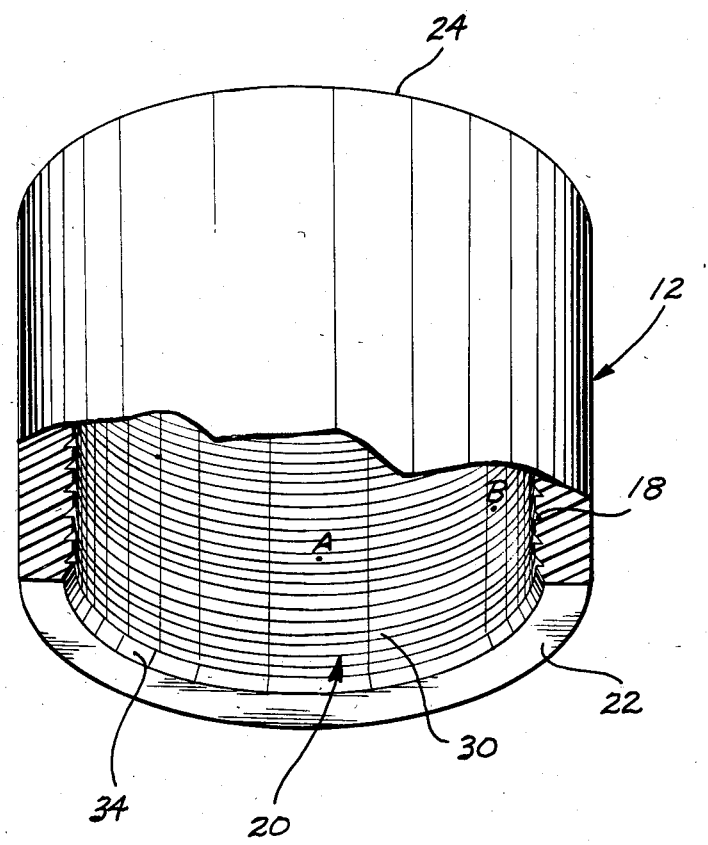
FIG. 1 is an isometric view, partially in section, of bushing made in accordance with the invention.

While, as illustrated in FIG. 1, a bushing 12 formed in accordance with the invention may have a housing that is cylindrical in shape, it is to be understood that the exterior shape of the bushing housing does not form part of the invention. Rather, the exterior configuration of the bushing housing can take on any desired shape as determined by the environment in which the invention is to be utilized. The bushing 12 includes a bore 20 that extends through the entire length of the bushing from a first end 22 to a second end 24. The wall 30 of the bushing that is defined by the bore 20 has a continuous groove 18 that extends from the first end 22 to the second end 24. The groove 18 is in the configuration of a counterclockwise helix extending from the first end 22 to the second end 24. Thus, the groove has a positive slope with respect to the circumference of the bore. The direction and slope of the groove in the bore can best be appreciated by scrutiny of FIG. 1, wherein traveling from any point such as A on the groove 18 in a counterclockwise direction (with respect to the first end) to the point B on the same groove will result in point B being slightly more distant from first end 22 than is point A. This positive increase in distance divided by the distance between points A and B will result in a measurement of the slope of the groove (a dimensionless parameter) with respect to the circumference of the bore. The significance of the slope characteristics of the groove is discussed in detail below.

Figure 2:
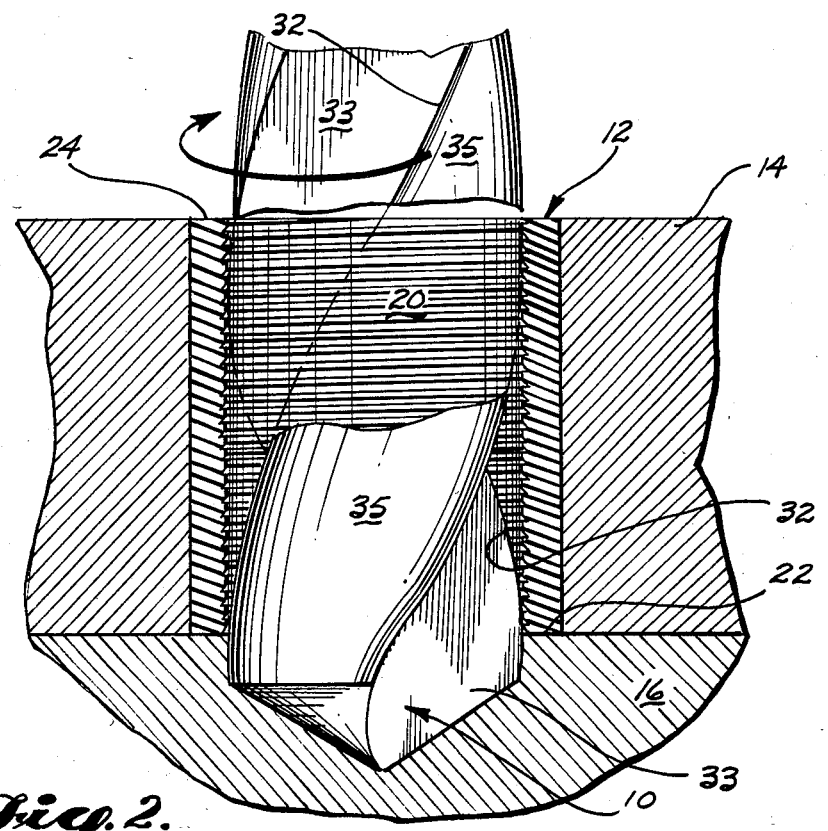
FIG. 2 is a longitudinal cross-sectional view of a bushing formed in accordance with the invention.

FIG. 2 shows bushing 12 mounted in an opening in a drill plate 14. The bushing is mounted such that its first end 22 impinges on a workpiece 16 when the drill plate is positioned against the workpiece. A drill 10 having a diameter approximately equal to the diameter of the bore 20 is positioned within the bore 20. The drill is a conventional twist drill with flutes 33 and lands 35. The leading edges 32 of the lands 35 slide around the interior wall of the bushing as the drill is rotated in a clockwise direction.

Figure 3:
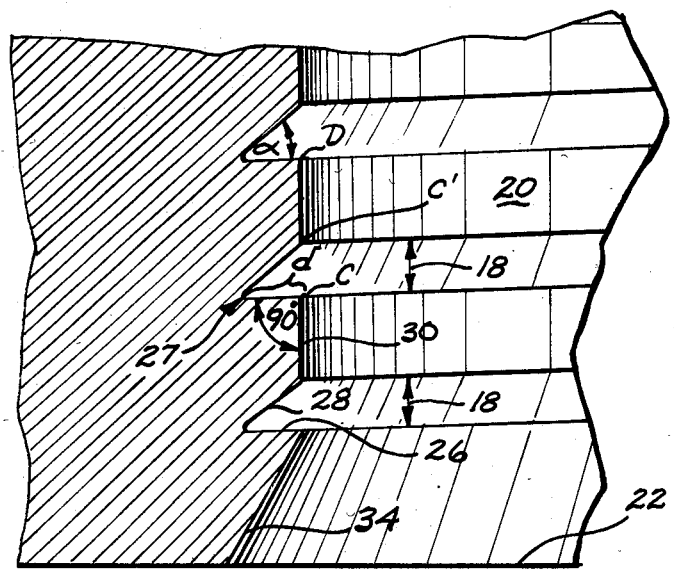
FIG. 3 is an enlarged detail of a part of the cross-section illustrated in FIG. 2.

In the preferred embodiment, the cross-sectional shape of the groove 18 (see FIG. 3) is defined by first and second surfaces 26 and 28. The first surface 26 of the groove defines an inclined plane which, at any given point along the circumference of the bore (e.g., point C in FIG. 3), is substantially perpendicular to a plane that is tangent to the circumference at that given point. The second surface 28 defines an inclined plane which, at any given point along the circumference of the bore (e.g., point C' in FIG. 3), obliquely intersects a plane that is tangent to the circumference of the bore at that same point. The first surface 26 and the second surface 28 intersect at a point 27 away from the interior wall 30 of the bushing. The angle of intersection between these surfaces is designated in the drawing as $\alpha$. The first and second surfaces are arranged with first surface 26 being positioned between the second surface 28 and first end 22 at any point on the groove 18. The radial distance between the interior wall 30 and the point 27 in the groove defines the depth "d" of the groove.

The distance between any two longitudinally aligned points on the groove (points C and D in FIG. 3) is defined by the selected slope of the groove 18 multiplied by the circumference of the bore. The multiplicative inverse of the actual value of this distance is commonly known as the "pitch" of the groove in terms of grooves per unit of length.

The width of the groove (i.e., the distance between points C and C' in FIG. 3) is defined by the selected values for angle $\alpha$ and the depth of groove d. The width of the groove can also be conveniently stated in terms of the pitch described above. The preferred values for the above parameters are discussed shortly.

As the drill 10 is rotated it shaves chips (not shown) from the workpiece 16. As the chips travel up the flutes 33 of the drill, the centrifugal force created by the rapid rotation of the drill tends to propel the chips outwardly from the drill. Portions of the chips are propelled into the groove 18 by the rotating drill causing the entire chip to be urged upwardly along the length of the groove 18 by the positively sloping surface 26 of the groove.

Preferably, the slope of the groove 18 lies between 1.3% and 4.5%. While this range of groove slope is preferred, acceptable chip extraction is accomplished by grooves with slopes as great as 50%. Beyond a 50% slope, the first surface 26 of the groove 18 approaches a parallel relationship with the leading edge 32 of the drill lands 35. When this relationship occurs, the chips are chopped between that leading edge 32 and the first surface 26 of the groove 18. As noted earlier, chopped or broken chips tend to rapidly compact in the bushing, binding the drill. This is avoided by a bushing made in accordance with this invention, i.e., a bushing made in accordance with the invention does not chop or break up drill chips. Rather, the gradually inclined surface of bushings formed in accordance with the invention guide chips through the bushing as the drill rotates.

It is necessary to score the interior wall of the bushing with the groove 18 so that a certain portion of the interior wall 30 remains intact for proper guiding of the drill. In the preferred embodiment, intersection angle α and groove depth d are selected so that the width of the groove will be approximately 40% of the distance between two corresponding points (C and D in FIG. 3) on longitudinally aligned portions of the groove 18. That is, the groove width is selected to be 40% of the product of the slope and the circumference of the base. As noted earlier, the desired groove width can also be defined as 40% of the multiplicative inverse of the value of the groove's pitch. Thus, 60% of the area of interior wall 30 of the bushing will remain for precise guiding of the drill. The actual values of α and d will vary depending upon the slope chosen and the diameter of the bushing used. While 60% is preferred, the amount of the interior wall surface area remaining after the groove is scored can vary considerably without interfering with the chip extraction properties of the bushing.

While the groove can extend completely to the first end 22 of the bushing, preferably, the first end 22 of the bushing is chamfered to provide a continuous beveled surface 34 between the workpiece 16 and the groove 18. The chamfering eliminates any sharp blade-like edges that are formed when a groove is allowed to taper completely to the edge of the bushing in which it is formed. Elimination of such edges reduces the possiblity of a sharp groove edge cutting into a chip. Thus, chamfering enhances the guiding (as opposed to chopping) characteristics of the groove.

While a preferred embodiment of the invention has been illustrated and described, it is understood that various alterations, substitutions and equivalents and other changes can be made without departing from the spirit and the scope of the invention, which is defined by the appended claims.

The embodiments of the invention in which an exclusive property or privilege is claimed are defined as follows:

1. In a bushing for guiding a rotating cutting member into a workpiece, said bushing comprising a housing having a cylindrical bore extending longitudinally through said housing between a first end and a second end for receiving and guiding said rotating member as said rotating member acts on a workpiece, the improvement comprising: a chip removing groove scored in the wall of said cylindrical bore, said groove extending from said first end to said second end of said cylindrical bore in a counterclockwise helix as viewed from said first end, the slope of said groove with respect to the circumference of said cylindrical bore being less than 50%.

2. The improvement claimed in claim 1 wherein the width of said groove is between 25% and 50% of the product of the slope and the circumference of said cylindrical bore.

3. The improvement claimed in claim 2 wherein the cross-sectional shape of said groove is defined by a first surface and a second surface, the plane of said first surface at any given point along the circumference of said cylindrical bore being substantially perpendicular to a plane that is tangent to the circumference of said bore at that given point, the plane of said second surface at any given point along the circumference of said cylindrical bore obliquely intersecting a plane that is tangent to the circumference of said bore at that given point, at any given point along the groove said first surface is oriented between said second surface and the first end of said cylindrical bore.

4. The improvement claimed in claim 3 wherein said cylindrical bore has a chamfered edge proximal to the first end of the bushing.

5. The improvement claimed in claim 4 wherein the slope of said groove with respect to the circumference of said cylindrical bore is between 1.3% and 4.5%.

6. The improvement claimed in claim 1 wherein the slope of said groove with respect to the circumference of said cylindrical bore is between 1.3% and 4.5%.

* * * * *

UNITED STATES PATENT AND TRADEMARK OFFICE
CERTIFICATE OF CORRECTION

PATENT NO.  :   4,594,031

DATED       :   June 10, 1986

INVENTOR(S) :   Earl B. Tesmer

It is certified that error appears in the above-identified patent and that said Letters Patent is hereby corrected as shown below:

Column 2, line 18, "earilier" should be --earlier--
          line 22, After "also" insert --desirable--
Column 3, line 30, Before "bushing" insert --a--

Signed and Sealed this

Twenty-eighth Day of October, 1986

[SEAL]

Attest:

DONALD J. QUIGG

Attesting Officer      Commissioner of Patents and Trademarks